United States Patent

[11] 3,608,886

| [72] | Inventor | Gary Y. Greene<br>Route 6, Box 16, Hickory, N.C. 28601 |
|---|---|---|
| [21] | Appl. No. | 832,198 |
| [22] | Filed | June 11, 1969 |
| [45] | Patented | Sept. 28, 1971 |

[54] SYSTEM OF DIGITAL JIGGING
7 Claims, 4 Drawing Figs.

[52] U.S. Cl. ................................................ 269/305,
33/180 R, 144/307, 269/300, 269/307
[51] Int. Cl. .................................................. B23q 3/00
[50] Field of Search........................................ 269/9, 10,
300, 305, 319, 307; 144/307; 33/180 A

[56] References Cited
UNITED STATES PATENTS
| 406,828 | 7/1889 | Fietsch ........................ | 144/307 UX |
|---|---|---|---|
| 2,508,837 | 5/1950 | Peffers ........................ | 269/9 UX |
| 3,240,485 | 3/1966 | Oser ............................ | 269/305 |
| 3,463,479 | 8/1969 | Hennessey.................... | 269/9 X |
| 3,501,842 | 3/1970 | Beasley ....................... | 33/180 A UX |

*Primary Examiner*—Andrew R. Juhasz
*Assistant Examiner*—Donald D. Evenson
*Attorney*—James E. Britt

ABSTRACT: Instead of forming and storing a separate jig for each workpiece which is to be subjected to a machine operation or other workprocess, a series of cams are set in coded positions by reference to a code table consisting of digital symbols which makes it possible to reform a jig at any future time from a few basic parts.

The devising a system of digital symbols makes possible to use the process in sophisticated methods of control.

Gary Y. Greene INVENTOR.
BY Jas E Britt
His Attorney

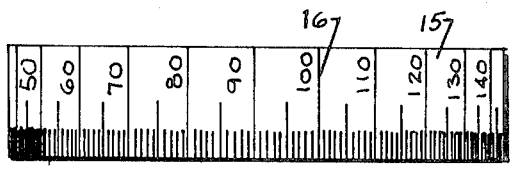
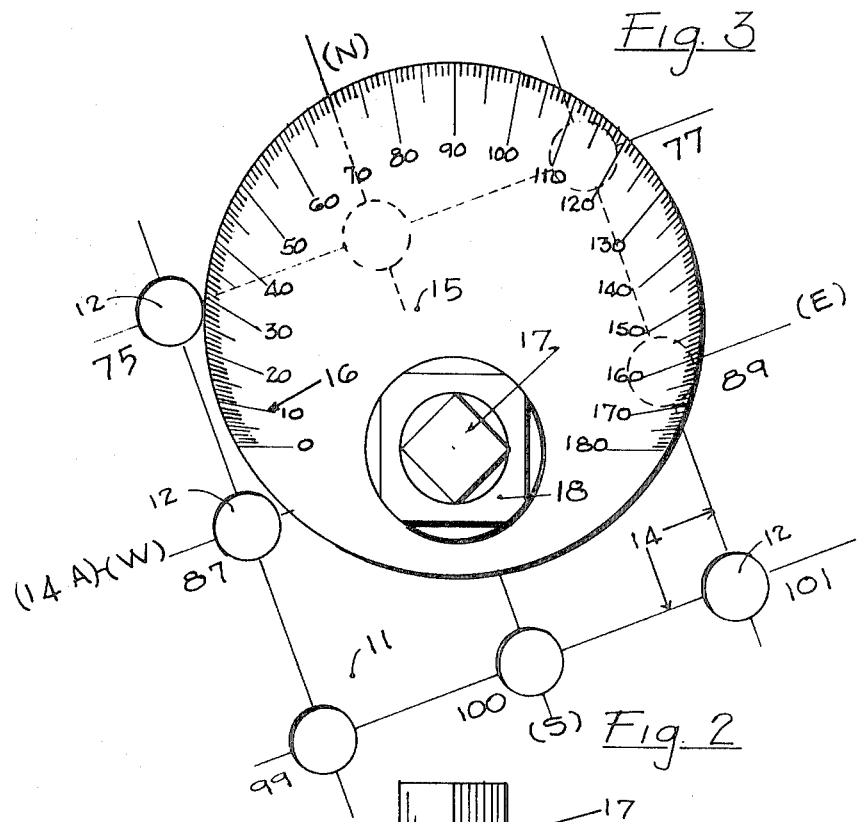
Fig. 3
Fig. 2
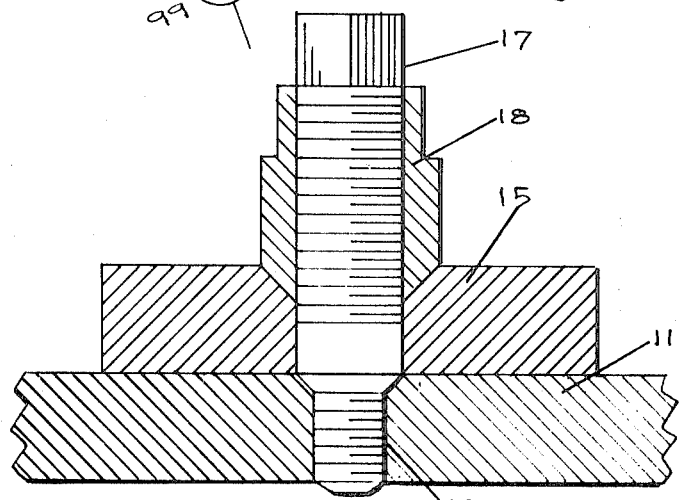
Fig. 4
Gary Y. Greene, INVENTOR.
BY *Jas C Brin*
His Attorney

SYSTEM OF DIGITAL JIGGING

This invention relates to a system of jigs, fixtures or like devices for positioning work on a worktable or jig pallet for machining operations, fabrication or other work processes constructed and arranged to produce a digital code which can be recorded and used to reset the jig devices in their original work locating positions at any later time.

It is the object of this invention to devise a method for producing, for each particular shaped workpiece, or other object to be located, a digital code to record the desired position of a workpiece on a worktable or jig pallet by obtaining a series of code numbers or digital groups derived by employing a series of like or similar jig members set in referenced positions so that a position code may be determined and recorded for each jig member in the series, which, when grouped together, will constitute the position code for use in locating that or like workpieces in the same position on a pallet or worktable.

It is another object to provide a jigging system such that, once the setup has been made and the codes recorded for a given setup for a particular type of workpiece, the setup can quickly and easily and with predetermined accuracy be repeated for that or a like workpiece on a like machine or on a jig pallet by providing a work-holding table or pallet having a uniform pattern of referenced centers and a series of cams, alike in configuration, set in position at suitable centers by referring to the codes.

A still further object is to provide a system of unique usefulness when a variety of workpieces is to be processed at different times on the same or similar work-handling machines or work-handling stations necessitating a different setup each time the work process is changed over after a run of a given type of workpiece to begin a run on a different type of workpiece. Normally, in such a situation a number of forms, jigs and fixtures are required to accommodate each of a variety of parts or workpieces. This entails storage and retrieval of such forms as correspond to each workpiece having a different shape as processing on it is scheduled to begin. When the forms are remounted as in former practice, the accuracy of the setup must be checked by mensuration. By the system to be described herein the problems of storage, retrieval, and resetting by mensuration are practically eliminated; the process simplified to such an extent that inexperienced persons can be used; and due to the extent of simplification, a great deal of time can be saved. And also a great reduction, in the number of jig items and related parts and the material to provide these, is accomplished.

Another object is to provide positioning cams, each having referenced angular lines radiating out from its center of rotation and a worktable or pallet having centers on which the cams are located with referenced lines radiating out from their centers, the lines on the cams and those on the table being so related that as cams are positioned to locate a workpiece, that certain lines on a cam and table will coincide and by recording the reference symbols designating the coinciding lines, a code record can be made from which the cams can be reset in the same position at any later time.

Another object is to devise a system consisting of reasonably simple components which can easily be produce in the number or quantity required and are readily interchangeable in use.

Still another object is to devise a system of workpiece setup which may be accomplished by the use of or reference to digital coding and which may be easily assimilated into modern sophisticated methods of control.

These and other objects will be apparent from the following description taken in connection with the accompanying drawings in which:

FIG. 2 shows the face of a cam in relationship to the reference lines on the table and radial division or index lines on the cam;

FIG. 3 shows the index lines as they are extended over the edge of the cam; and

FIG. 4 is a typical cross section showing how a cam may be locked into position on the worktable.

Figure 1:
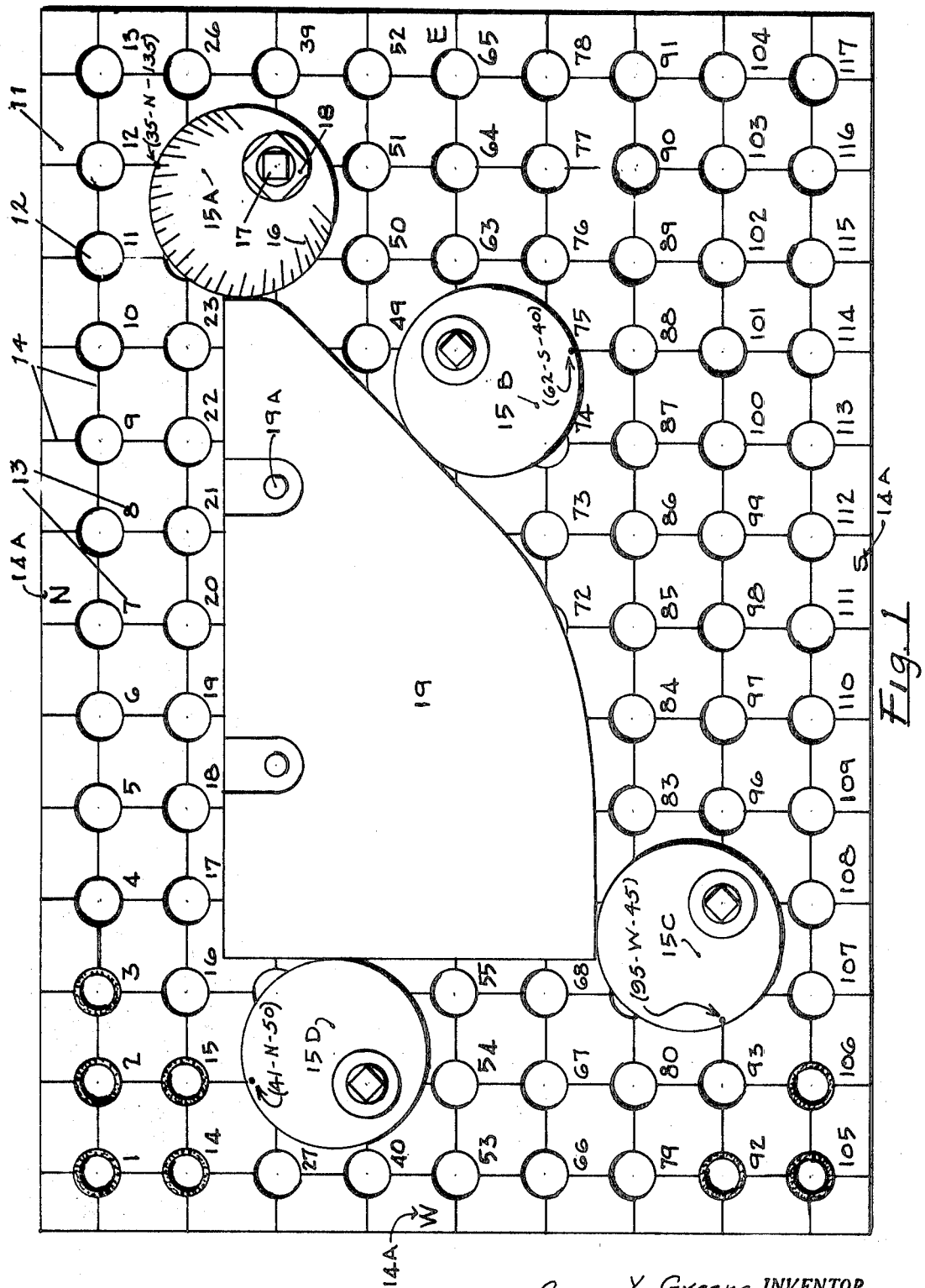
FIG. 1 is a typical worktable or work pallet having a system of referenced lines on its face and having a workpiece thereon and a system of cams positioned over referenced centers to cradle the workpiece.

Since the primary objective of this invention is to provide a method of repeating a given workpiece positioning by reconstructing a jigging setup by the use of numbers in a code table in lieu of other methods now in use, the parts must be made and machined to work with a high degree of precision. Therefore a detailed description will be given.

Referring now to the drawings, FIG. 1 shows a worktable or pallet 11 which may be secured in a work-holding position at a work station in any well-known manner. The pallet is provided with a system of grid lines which intersect at right angles on referenced centers 12 having reference digits or digital determinants symbols 13 assigned separately to each center in a pattern to indicate its position on the pallet. The digits may be assigned as in the drawing in an enumerative order, beginning with the digit "1" at the upper left corner and reading to the right by units and downward by lines ending, on the pallet illustrated, with the opening 117 in the lower right corner. The centers can be referenced by a quadrant system or whatever other system might serve to the best advantage. As shown, reference lines 14 pass through the centers at right angles and radiate out therefrom in rectilinear coordinate fashion.

Locater cams 15A, -B, -C, -D, etc., usually three or more, are mounted over suitable centers and rotated sufficiently to contact and cradle a workpiece in the desired position on the pallet or worktable, as will be more fully explained. The shape of the cams are shown in their most simple form as circular or cylindrical and designed to pivot about a point eccentric from their center.

The diameter and offset of the cams 15 preferably have a relationship to the oncenter spacing of the centers 12. As illustrated in the drawings, the diameter of cams 15 are approximately twice the oncenter distance between centers 12, while the offset or eccentricity is approximately one-fourth the diameter of the cams. When substantially these relationships are maintained, a suitable center will always be found over which a cam may be mounted to be brought into cradling contact relationship with the workpiece. Thus the location of the workpiece might be termed universal within the limitations of a particular work pallet.

Referring now to the drawings FIGS. 2 and 4, in order to set and hold the cams in cradling contact with a workpiece a highly accurate system of mounting and positioning the cams has been devised. A stem or pin 17 is inserted and secured in a selected one of the referenced apertures 12 in the pallet or table 11. To accurately locate the pins 17 than can be done by the usual sliding fit, the apertures in the pallet are countersunk and tapped to receive a reduced chamfered and threaded stud portion of the lower end of pin 17, as shown in FIG. 4. When screwed down firmly, this will set the stem exactly centered in the aperture. The upper portion of the stem, above its chamfered section, is threaded to receive a locknut 18. Each of the cams is provided with an opening at its pivot center to fit around the stem. The face end of the opening in the cam is countersunk accurately with reference to its axis of rotation. The contact end of locknut 18 is chamfered accurately with reference to its axis of rotation to fit in the countersink in the face of the cam. When screwed down, this will also set the cam exactly centered on the stem and therefore exactly centered over the aperture 12. The coordinate or lateral position of a cam can always be determined by the digital code assigned to the pallet aperture in which the stem is inserted. The method of locating a cam as described will position the cam very accurately. However, other means for accurately securing a cam in place may be employed.

For determining the angular position of a cam, segmental markings 16, preferably on a scale indicating in degrees, are placed on the face of the cam and in its preferred form are extended down over the periphery as shown in FIG. 3 for more accurate reading. The degree designations in the digital determinates are arranged to read from 0° to 180° oriented on the cam as shown in FIGS. 2 and 3. The 90° mark or center of the scale is arranged to fall on the center line through the cam center and its pivot center. The 0° to 180° lines are on the line through the pivot center at right angles to the 90° line just referred to. The code reading for the angular position of a cam will be made from a degree marking 16 on the cam which registers with one of the reference lines 14 radiating out from the aperture over which the cam is set.

These lines 14 as depicted in the drawings radiate out in four directions. See FIGS. 1 and 2. Orientation symbols 14A are used to designate these lines. Those extending upward will be designated as "N"; to the right as "E"; downward as "S"; and to the left as "Wo" Other designations might be used.

According to the above description, a complete digital code reading for one cam will include three parts: one, the digits which designate the center over which cam is positioned to pivot; two, the designation of the reference line N, E, S, or W on which the cam angular readout has been taken; three, the angular readout on that line. Applying this to the illustration shown in FIG. 2, the code readout for cam 15 would be 88–N–70, in which "88" designates the digits assigned to the aperture in which the cam stem is inserted, "N" a reference line radiating upward from the stem aperture; and "70" the digit designation of the cam angle line registering with the N-reference line. It may be possible to make alternate readouts for a given position of a cam. In this case it could be 88–E–160 if the readout is taken on the reference line out to the right.

Using my invention it is no longer necessary to construct and store a separate jig for each type of workpiece once the method of setting and recording the position of cams, as just described, is employed. Instead, for the initial jigging of a workpiece, it is placed and temporarily held in the proper position for the desired work process. Then a series of three or more cams are set at positions chosen so that they may be rotated into contact with the workpiece. A suitable number of cams set in contact with the workpiece forms a jig cradle in which the workpiece may be positioned for its operation and may be removed and replaced successively with like workpieces until the desired number has been run. However, as soon as it has been ascertained that the workpiece has been properly jigged, the position code digits will be readout and recorded.

To illustrate, refer to FIG. 1 in which the cams clockwise from the upper right corner are designated 15A, 15B, 15C, and 15D, and the workpiece or part designated 19. The cam readouts for part 19 may be recorded as follows: A=38–N–135, B=62–S–40, C=95–W–45, D=41–N–50. This set of codes may be included on a work detail sheet or tag as jigging data along with other pertinent information. With such a digital jigging code table the same cradle may be reformed on pallet 11 or a similar pallet or worktable at any future time.

Part Name & Number— Bracket
Machine— Boring Machine #3
Operation— Holes #1 - #2

| Workpiece Location Code | Machine Information |
|---|---|
| 000–E–000 | Tool Bit Style A–B |
| 000–N–000 | Bit Referenced |
| 000–W–000 | Home Point— 00 00 |
| 000–S–000 | Hole Locations From Home Point |
| | #1 #2 |
| | $x = -17.50$ $+17.00$ |
| | $y = +8.00$ $+7.00$ |

The form shown is a typical layout for a tag or worksheet showing four possible cam location codes along with other data which would be used to reform a cradle for locating a certain part for a machine operation or other work process. There are obviously many other ways in which cam location codes may be used.

To use my invention, having in stock the parts herein described including a table or pallet with referenced centers, cams with their referenced index lines, the described or similar means for accurately locating cams at the centers and a tabulation of workpiece location codes, it will be easy to follow a typical procedure such as will now be described.

The jigging operator will receive a tagged workpiece or one for which the workpiece location code table has been identified. The number of cams indicated in the code table are then obtained and one for each code line is located and positioned as the line calls for. When this is completed the workpiece will fit into the cradle thus formed by the cams. In the cradle the cams will be in positioning contact with the workpiece which then may be clamped in the usual manner for the work process which it is to undergo in this position. To firmly cradle a workpiece usually three or more cams outlining the cradle will be required.

From the description of my invention it will be seen that it is simple in form and detail. The parts of hardware are few. They consist of a machine or other worktable with a system of markings to designate centers on the table, a series of alike cams and pivot pins or other means to locate the cams over apertures which are arranged as already described to locate a workpiece in a desired position.

There are many distinct advantages resulting from the systems of digital jigging and referencing embodied in my invention. The most distinct advantage is that it is built on a system of numerically referenced codes by means of which positions may be quickly and accurately readout and recorded to use in relocating these same positions in the future.

Another advantage is that the code gives information in a simple form so that it can be incorporated into various types of instructional routing sheets that are used in the production of component parts or assemblies.

Another advantage is that the setup time and checkout time will approach a more constant value and can be better incorporated into piece work time standards.

Still another advantage is that, personnel with limited training can be used to make precise setups which can be more easily checked by supervisors.

Yet another advantage is that it offers a versatile creative solution concept to the master setup engineer or technician which leads to making a code record in standard form for future use.

What I claim is:

1. In a system of digital jigging, a jig table pallet or base having thereon reference lines intersecting in rectilinear coordinate fashion by means of which positions on the base may be easily designated, digital determinants assigned to each intersection in serial order, definite uniform apertures in the base centered on the intersections, a system of cams having stems fitting into said apertures and arranged to be set at such intersections and at such angular positions as will define a cradle for positioning a workpiece, a system of digitally designated angular determinates emplaced severally on the cams, so that one of the angular determinates when moved into contact with a workpiece previously placed in a work position will assume a coinciding reference position with respect to the reference lines on the base, whereby an easily and accurately made readout of the determined digits on the cam and those that determine its position on the base may be combined to furnish a code by the use of which the cams may subsequently be set in the same relative positions to reform the cradle at any future time.

2. In a system according to claim 1, in which when three or more cams of the type described are set in position to cradle a workpiece on the table or pallet base, and the code for the angular position and the coordinate position of each separate cam having been readout when grouped together will provide a code combination or unit table of codes whereby the same jig cradle may subsequently be reformed at any time.

3. In a system according to claim 2, in which the process for reforming a jig or cradle for holding a workpiece will consist, by reference to the code table, of setting the required number of cams with determinant markings over the apertures designated by the respective digits in the code units apertaining thereto, rotating them into angular position designated by other digits in the code apertaining to their angular position and securing the cams in their respective set positions thus duplicating their original setting for each cam and its original function in forming the jig cradle for the workpiece.

4. In a system according to claim 2, in which the cams are set at the referenced intersections to designate their location, stems centered in the intersections, the lines radiating out from the intersections are referenced to indicate their directions, referenced angular markings on the cams arranged to register with one or more of the radiating lines, position digits or determinants assigned both to the centers and to the referenced lines on the tables and cams from which a digital readout code may be made, one for each cam, which records both the lateral and angular position of each cam, and when taken together as a set of codes will constitute a code record of a group of cams forming a jig cradle for a particular workpiece and which may be used to reconstitute the same setup at any time in the future.

5. In a system according to claim 1, in which the cam pivot pins are centered in the table apertures by providing a countersink centered about the axis of the aperture and a mating chamfered shoulder on the pins chamfered about their axes and arranged to seat in the countersink, and a countersink similarly centered in the face opening of the cam and locknut centered on the pivot pin with a chamfered shoulder mating with the cam countersink to assure the exact centering of the cam pivots over the referenced openings.

6. In a system according to claim 1, in which the cams designed to rotate about an eccentric axis each have a circular circumference, a system of referenced markings on the cams arranged to designate angular positions with respect to said pivot, the marking midway of the system being located on a line through the center of the cam and its eccentric axis and other markings on the cam designating right angular positions from said center line and a suitable number of additional markings on the cam to designate angular positions with respect to these lines.

7. In a system according to claim 1, in which the cams are constructed with diameters not less than twice the on center distance between the cam stem apertures, the stem about which they rotate being offset not less than one-fourth the diameter of the cam, whereby the sweep of the cam positions may be universal within the limitations of the base when the stems are set in appropriate apertures.